(12) United States Patent
Kokkonen et al.

(10) Patent No.: US 7,308,237 B2
(45) Date of Patent: *Dec. 11, 2007

(54) COMMUNICATING INFORMATION ASSOCIATED WITH PROVISIONING OF A SERVICE, OVER A USER PLANE CONNECTION

(75) Inventors: Petri Kokkonen, Espoo (FI); Markus Maanoja, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/518,929

(22) PCT Filed: Jun. 28, 2002

(86) PCT No.: PCT/FI02/00582

§ 371 (c)(1),
(2), (4) Date: Feb. 17, 2005

(87) PCT Pub. No.: WO2004/004394

PCT Pub. Date: Jan. 8, 2004

(65) Prior Publication Data

US 2006/0063534 A1    Mar. 23, 2006

(51) Int. Cl.
*H04B 1/16* (2006.01)
*H04Q 7/20* (2006.01)

(52) U.S. Cl. .............. 455/185.1; 455/456.1; 455/456.3; 455/458; 455/450; 701/207; 701/213; 340/426.19; 340/539.13

(58) Field of Classification Search .............. 455/44.1, 455/414.2, 411, 412.1, 414.1, 418–420, 456, 455/414.3, 456.1, 456.2, 456.3, 456.5, 456.6, 455/461, 179.1, 185.1, 404.2, 433, 450, 458, 455/464, 466, 509; 701/207, 208, 209, 211, 701/213, 226; 340/426.19, 539.13, 991, 340/993, 988, 995.25

See application file for complete search history.

(56) References Cited

U.S. PATENT DOCUMENTS 5,841,396 A * 11/1998 Krasner .................. 342/357.02

(Continued)

FOREIGN PATENT DOCUMENTS

| WO | WO 00/24209 | 4/2000 |
|----|----|----|
| WO | WO 00/44148 | 7/2000 |
| WO | WO 00/76171 | 12/2000 |
| WO | WO 02/054811 | 7/2002 |
| WO | WO 03045084 A2 * | 5/2003 |

OTHER PUBLICATIONS

ETSI STC SMG4, TDoc SMG4 98P482, Technical Specification, Sep. 28, 1998-Oct. 2, 1998, Sophia-Antipolis, France, "Clarifications on IP interworking", SMG4 GPRS Subgroup.

(Continued)

*Primary Examiner*—William Trost
*Assistant Examiner*—James D Ewart
(74) *Attorney, Agent, or Firm*—Squire Sanders & Dempsely L.L.P.

(57) ABSTRACT

A method of communicating information associated with provisioning of a service in a communication system and arrangement for the same is disclosed. In the method information about possible associations between an identifier of a mobile user equipment (10) and user plane addresses is stored in storage means (34). A service provisioning entity may receive a request for the service from a client (24) connected to the communication system. Said request includes an identifier of the mobile user equipment. It is verified if a user plane address can be found from the storage means based on the identifier. If such a user plane address is found from the storage means, data associated with provisioning of the requested service is communicated to the mobile user equipment over a user plane connection associated with said address found from the storage means. If no user plane address can be found from the storage means based on the identifier, a new user plane connection is established, and data associated with provisioning of the requested service is communicated to the mobile user equipment over said established user plane connection.

20 Claims, 4 Drawing Sheets

U.S. PATENT DOCUMENTS

| | | | |
|---|---|---|---|
| 5,887,256 A * | 3/1999 | Lu et al. | 455/426.1 |
| 5,940,770 A * | 8/1999 | Kuki | 455/510 |
| 6,028,854 A * | 2/2000 | Raith et al. | 370/347 |
| 6,058,338 A * | 5/2000 | Agashe et al. | 701/13 |
| 6,104,931 A * | 8/2000 | Havinis et al. | 455/456.5 |
| 6,134,483 A * | 10/2000 | Vayanos et al. | 701/13 |
| 6,181,934 B1 * | 1/2001 | Havinis et al. | 455/432.3 |
| 6,266,533 B1 * | 7/2001 | Zadeh et al. | 455/456.2 |
| 6,411,811 B2 * | 6/2002 | Kingdon et al. | 455/456.5 |
| 6,463,288 B1 * | 10/2002 | Havinis et al. | 455/456.1 |
| 6,463,289 B1 * | 10/2002 | Havinis et al. | 455/456.4 |
| 6,535,398 B1 * | 3/2003 | Moresco | 361/792 |
| 6,535,815 B2 * | 3/2003 | Bloebaum | 701/213 |
| 6,577,619 B2 * | 6/2003 | Savuoja | 370/349 |
| 6,594,498 B1 * | 7/2003 | McKenna et al. | 455/517 |
| 6,603,978 B1 * | 8/2003 | Carlsson et al. | 455/502 |
| 6,625,458 B2 * | 9/2003 | Pihl et al. | 455/456.1 |
| 6,741,188 B1 * | 5/2004 | Miller et al. | 340/995.1 |
| 6,754,833 B1 * | 6/2004 | Black et al. | 726/7 |
| 6,807,427 B1 * | 10/2004 | Sakamoto et al. | 455/456.1 |
| 6,822,954 B2 * | 11/2004 | McConnell et al. | 370/352 |
| 6,879,838 B2 * | 4/2005 | Rankin et al. | 455/456.6 |
| 6,937,865 B1 * | 8/2005 | Bloebaum et al. | 455/456.1 |
| 7,009,948 B1 * | 3/2006 | Carlsson et al. | 370/329 |
| 7,026,987 B2 * | 4/2006 | Lokshin et al. | 342/357.15 |
| 7,068,189 B2 * | 6/2006 | Brescia | 340/531 |
| 7,076,256 B1 * | 7/2006 | Orler et al. | 455/456.1 |
| 7,190,685 B2 * | 3/2007 | Das et al. | 370/336 |
| 2002/0022483 A1 * | 2/2002 | Thompson et al. | 455/439 |
| 2002/0026361 A1 * | 2/2002 | Blom | 705/14 |
| 2002/0046084 A1 * | 4/2002 | Steele et al. | 705/14 |
| 2002/0098849 A1 * | 7/2002 | Bloebaum et al. | 455/456 |
| 2002/0150092 A1 | 10/2002 | Bontempi et al. | |
| 2003/0134646 A1 * | 7/2003 | Forrester | 455/456 |

OTHER PUBLICATIONS

3GPP TS 23.271 V4.2.0 (Jun. 2001), 3$^{rd}$ Generation Partnership Project; Technical Specification Group Services and System Aspects; Functional stage 2 description of LCS (Release 4), Jun. 2001, pp. 1-68.

* cited by examiner

US 7,308,237 B2

COMMUNICATING INFORMATION ASSOCIATED WITH PROVISIONING OF A SERVICE, OVER A USER PLANE CONNECTION

FIELD OF THE INVENTION

The present invention relates to communication of information to a mobile user equipment via a communication system. The invention may be used in provisioning of services for clients, e.g. in provision of information regarding the location of a mobile user equipment for an external client.

BACKGROUND OF THE INVENTION

A communication system typically operates in accordance with a given standard or specification which sets out what the various elements of the system are permitted to do and how that should be achieved. For example, the standard or specification may define if the user, or more precisely, a user equipment or terminal is provided with a circuit switched service or a packet switched service or both. The specification may also define the communication channels through which the signalling associated with various communication tasks are to be communicated. The manner how communication shall be implemented between the user equipment and the elements of the communication network may be based on a predefined communication protocol. In other words, a specific set of "rules" on which the communication can be based on needs to be defined to enable communication by means of the communication system.

In order be able to operate in a predefined manner, various different functions needs to be provided in a communication system. These functions can be divided in different categories. A category comprises functions that relate to the actual transportation of communication such as communication of voice, text or multimedia or other data. Another category can be seen as being formed by control or management functions. These include the control of the communication of voice, text, multimedia and other data communication. Provisioning of various services for the users needs also be controlled by appropriate control functions.

Signalling of messages associated with different functions is understood as being implemented on different planes. For example, control messages are communicated on a control plane and the actual communication of voice, data and so on is transported on a user plane. The communication on the user plane can be supported by the signalling of the control messages on the control plane. The skilled person in the art of communication systems is familiar with principles of dividing various functions into planes, and therefore these will not be explained in any greater herein.

Typically the communication systems provide this by means of separate channels, e.g. by means of separated signalling and communication channels. Such arrangements are employed e.g. by signalling system 7 (SS7) core networks and Q.931/GSM/WCDMA (Global system for Mobile communication/Wideband Code Division Multiple Access) subscriber access. Therefore the term "Signalling channel" may sometimes be used when referring to control plane communications. Similarly the term communication channel may be used when referring to user plane communications.

The various functions of the communication systems may have been developed quite independently from each other and may use different rules such as protocols in different communication systems. The standards and protocols define e.g. which plane shall be used for a certain purpose.

Various services can be provided for a user of a user equipment by means of a communication system. The services can be provided by the operator or operators of the communication system, such as a telephone or data network operator. At least a part of the services can be provided by service providers that are external and/or independent from the operators of the communication system.

Communication network systems that provide mobility for the users thereof are known. The skilled person is aware of the basic principles of such mobile communication systems. A well known example is the public land line mobile network (PLMN), known also as a cellular communication network. Another example is a mobile communication system that is at least partially based on use of communication satellites.

Services that utilise information ab1out the geographical location of a mobile user equipment (and thus the user) in the service provisioning are also known. Such services are sometimes referred to as location sensitive services. Recent development in the field of mobile communications has lead to arrangements wherein information about the current location of a mobile user equipment is determined and can be utilised in provision of various services for the user of the mobile user equipment.

The mobile network apparatus and/or mobile user equipment such as a mobile station can be employed for provision of information regarding the geographical location of the user equipment and thus the user thereof. A mobile user equipment and the user thereof can be positioned by various different techniques. For example, substantially accurate geographical location information that associates with a user equipment can be obtained based on the known satellite based GPS (Global Positioning System). In another approach the cells or similar geographically limited radio access entities and associated controllers of the communication system are utilised in production of an estimate concerning the location of the mobile user equipment. The communication system may also be provided with specific location measurement units (LMUs) that provide data concerning the location of a user equipment.

It is also possible to conclude geographical location even if a mobile user equipment is located within the coverage area of a visited or "foreign" network. The visited network may be made capable of transmitting the location of the mobile user equipment back to the home network, e.g. to support services that are based on location information or for the purposes of routing and charging.

The production of data for the location determinations (such as various measurements and calculations) does not form an essential element of the present invention, and is thus not described in any greater detail herein. It is sufficient to note that a location service (LCS) entity may be employed in the provisioning of location information associated with a target mobile user equipment for an entity that has requested for such information (the client). The client may comprise a service application that may use the information is provisioning of location sensitive information for the subscribers to its services. The location service entity may implemented within the cellular system or connected thereto. The location service entity provided by the communication system may serve different clients via an appropriate interface. The location service entities may provide the location information based on data that has been provided by various sources. Location data may also be processed in the user equipment that is provided with appropriate processing capacity. The user equipment may then provide the location service entity or the client with, location data, for example location co-ordinates.

The client may make use of that location information for various services/applications, such as for location of a mobile telephone that has made an emergency call, for locating vehicles or given mobile subscribers for commercial purposes and so on. In general, a client such as a user or entity wishing to receive location information regarding another user may send a request for such information to the location service provision entity. The location service provisioning entity will then process the request, obtain the required data for generating a response and generate an appropriate response.

An example of the provision of the location information by a PLMN is described in more detail $3^{rd}$ Generation Partnership Project (3GPP) technical specifications, see e.g. 3GPP TS 23.271 version 4.2.0, titled "Functional stage 2 description of LCS", June 2001. According to the 3GPP specification a location service (LCS) server entity referred to as a Gateway Mobile Location Center (GMLC) is provided for managing the location services. The GMLC is for gathering and storing various data that may be used in provision of location information for the location service clients (LCS clients).

The proposed location service (LCS) solutions employ control plane signalling channels for signalling messages that associate with the provisioning of the location services, such as for requests for location information, messages for conveying location service assistance data and so on. However, the inventors have found that the signalling of messages that associate with the provisioning of the location information may cause relatively high load on the control plane. This may be especially the case on the air interface between the mobile user equipment and the radio network apparatus servicing the mobile user equipment.

The inventors have found that this problem could be overcome if the user plane could be used for such purposes. By means of this it could be possible to avoid the use of the substantially heavy SS7 (signalling system No 7) based control plane signalling. Furthermore, use of the user plane could help in solving the problem that relates to the substantially high variations in the signalling load occurring is response to the location information service enquiries or other similar unpredictably occurring service request. This is so since no resource allocation is required for the packet switched user plane communication in the manner as is required for signalling the same information over the control plane.

A specific example of user plane communication that could be used for communication of data to and from the mobile user equipment is based on the Internet Protocol (IP). However, in order to be able to transmit e.g. assistance data on the user plane in an Internet Protocol (IP) based positioning system the entity of the location service need to be made aware of the IP address of the target user equipment. A problem in this is that the IP address of the target user equipment is not necessarily known by an application making the request to the location service. Even if the IP address of the requester of the location information is known by the application making the request, and is e.g. delivered in the http-header of the request (hypertext transport protocol header) to the location information service, the target user equipment may be different from the requester accessing the application. Furthermore, the addressing schemes such as the IP addressing may vary in different domains. Thus the application, requestor, operator and the target user equipment may have different addressing scheme in use in their own domains.

The prior art does not offer a solution wherein it could be possible to establish a user plane IP connection in the event that the user plane IP address of the target user equipment is not given by the requester. However, the target user equipment may already have a user plane session and thus a user plane IP address. The possible IP address of the target user equipment is known only by an access node such as an access server (e.g. a GGSN) to which the target user equipment is connected to for the Internet Protocol (IP) user plane session between the user equipment and the IP network.

The inventors have found a need for a solution wherein an existing user plane address, such as an Internet Protocol (IP) address, can be used for communication of data to the user equipment should such as address exist.

SUMMARY OF THE INVENTION

Embodiments of the present invention aim to address one or several of the above problems.

According to one aspect of the present invention, there is provided a method of communicating information associated with provisioning of a service in a communication system, the method comprising:

storing in storage means information about possible associations between an identifier of a mobile user equipment and user plane addresses;

receiving at a service provisioning entity a request for the service from a client connected to the communication system, said request including the identifier of the mobile user equipment;

verifying if a user plane address can be found from the storage means based on the identifier; and if such a user plane address is found from the storage means, communicating data associated with provisioning of the requested service to the mobile user equipment over a user plane connection associated with said address found from the storage means; and if no user plane address can be found from the storage means based on the identifier, establishing a new user plane connection and communicating data associated with provisioning of the requested service to the mobile user equipment over said established user plane connection.

According to another aspect of the present invention there is provided an arrangement in a communication system for provision of a service in response to a request from a client, the provisioning of the service requiring communication of data to a mobile user equipment, the arrangement comprising:

a service provisioning entity for receiving a service request from the client, the request identifying the mobile user equipment by means of an identifier;

storage means for maintaining information regarding possible associations between the identifier of the mobile user equipment and user plane addresses that can be used for user plane data transmissions in said communication system, wherein the storage is arranged to verify if a user plane address for communication of data can be found from the storage means based on the identifier, and, if such a user plane address is found from the storage means, data associated with provisioning of the requested service to the mobile user equipment is communicated over a user plane connection associated with said address found from the storage means, and if no user plane address can be found from the storage means based on the identifier, a new user plane connection is established and data associated with provisioning of the requested service to the mobile user equipment is communicated over said established user plane connection.

The solution enables mapping between the identifier of the user equipment and the user plane address independently from the client application. The embodiments enable mapping e.g. a MSISDN (Mobile Subscriber Integrated Services Digital Network) number to IP addresses used by other servers. The mapping can be done in the service delivery chain. The mapping is preferably done by entity or entities controlled by the operator of the communication network. Thus the operator may control how much information is revealed for entities outside the operators own system. The embodiments provide a method for associating an identifier obtained from the client application with an IP address of the target user equipment at the same time while it is possible for client entity (e.g. a location service entity) to access the address data. The client entity may trigger establishment of a user plane connection if the target user equipment does not have an active user plane connection.

The embodiments enable service applications (e.g. location service applications) wherein assistance data may be carried over a connectionless user plane connection. It is possible to avoid the problems associated in the provision of the data communication user plane address, such as the IP address, for the delivery of the assistance data. The herein proposed concept can also be enhanced to support anonymity of the users.

If the mapping functionality is arranged as a separate function in the home PLMN the mapping can also be provided for roaming users. Visited home network can request for the user plane address from location service entity counterparts of the other network Furthermore, in embodiments wherein the address mapping is done in the home network of the target user equipment the changes of obtaining the correct user plane address of the user equipment is improved.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
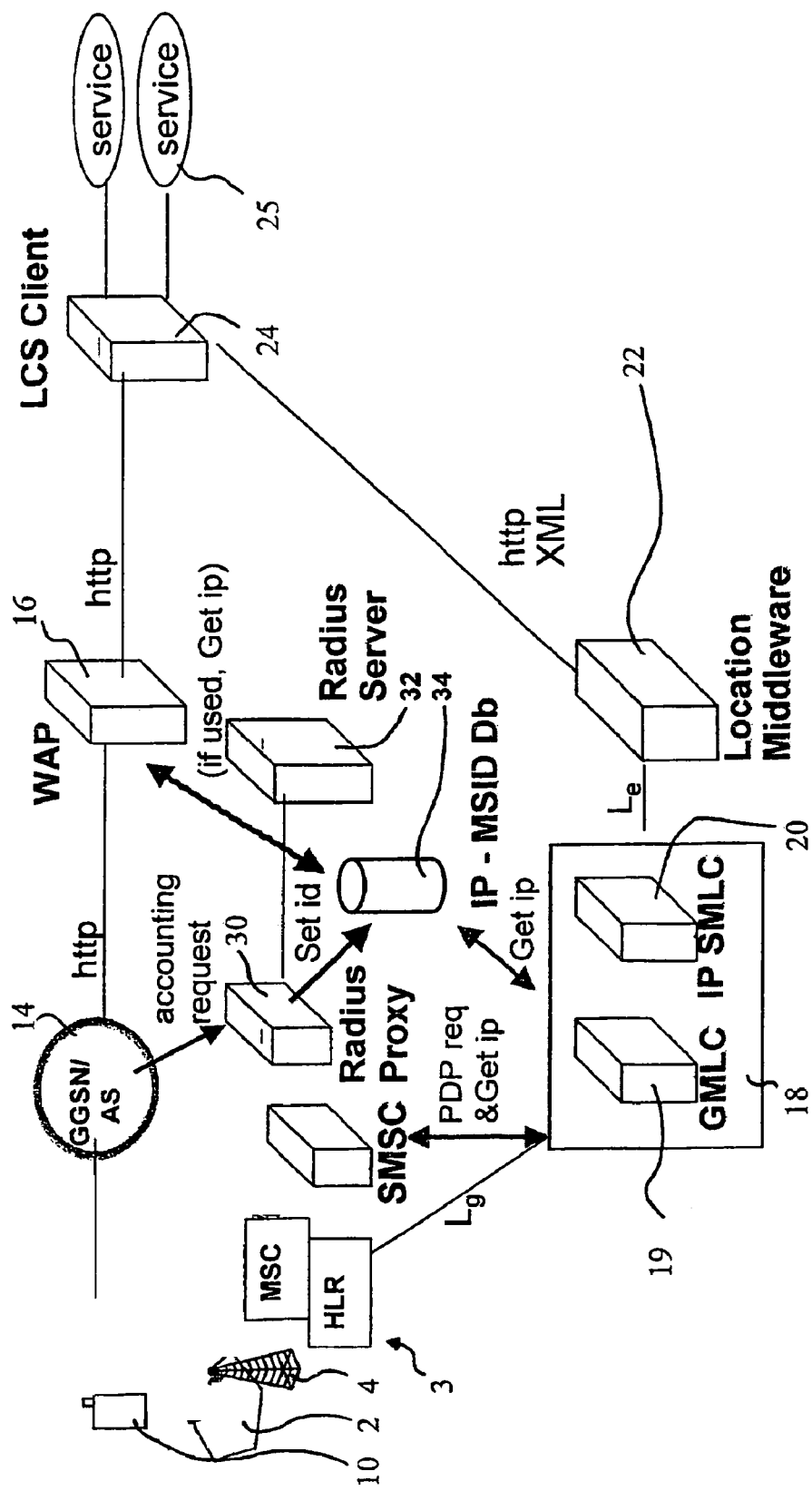
FIG. 1 shows the concept of an embodiment of the present invention.

Reference is made to FIG. 1 which is a simplified presentation of a cellular system to which the present invention may be applied. More particularly, FIG. 1 shows an arrangement wherein the radio access network 3 of a cellular system provides radio coverage areas i.e. cells 2. Each radio coverage area 2 is typically served by a base station 4 (only one base station shown for clarity). It should be appreciated that a cell may include more than one base station site. A base station apparatus or site may also provide more than one cell. The shape and size of the cells 2 depend on the implementation and may be different from the illustrated shapes. The shape and size of the cells may also vary from cell to cell.

Each of the base stations is controlled by an access network controller. For example, a 3G radio access network controller (RNC) or a more conventional base station controller (BSC) of the GSM may be used for such purposes. The access network controller may be connected to appropriate core network entities of the cellular system, such as a MSC (mobile switching centre), a HLR (home location register) and/or SGSN (serving general packet radio service support node), via a suitable interface arrangement.

User equipment such as a mobile station (MS) 10 is also shown. It shall be appreciated that a number of user equipment may be in communication via the cellular system although only one mobile user equipment is shown in FIG. 1 for clarity. The mobile user equipment 10 is arranged to transmit signals to and receive signals from the base station 4 via a wireless interface. By means of this arrangement the access network 3 can serve the mobile user equipment 10. In order to ensure proper operation of the system, control messages that associate with calls to and/or from the user equipment 10 needs typically to be communicated on the control plane between network entities and the user equipment 10.

It shall be appreciated that the various entities associated with the radio access network and the communication system are shown and briefly described only in order to facilitate the understanding of the invention. These entities do not form an essential element of the invention, and are thus not explained in any greater detail herein.

The location of the mobile user equipment 10 may vary in time as the user equipment is free to move within the coverage area of a base station and also from a coverage area (cell) to another coverage area. As mentioned above, the modern communication systems are capable of providing information regarding the geographical location of a user equipment within the coverage area thereof. The geographical location may be defined, for example, on the basis of the position of the mobile station relative to the base station(s) of the mobile telecommunications network and/or based on information from a satellite based positioning system.

The communication system may be provided with various different entities for processing information gathered from the cells and/or some other parameters and/or for computing by processor means appropriate calculations for determining and outputting the geographical location of the target user equipment. The location information may be obtained by using one or more of the appropriate location techniques. At least a part of the location information may be provided based on information provided by system that is separate from the communication system, such as by means of the satellite based Global Positioning System (GPS), assisted GPS (A-GPS), Galileo™ or similar.

The user equipment 10 may be adapted to perform location measurements and/or calculations and other processing required for the provision of information regarding the geographical position thereof. The user equipment may accomplish this e.g. using an OTDOA (Observed time difference of arrival) and/or TA (timing advance) or similar capability thereof. The user equipment 10 may alternatively or in addition be a GPS enabled terminal. That is, the user equipment may be provided with a GPS receiver for receiving signals from GPS satellites and means for processing GPS data. A part of the GPS data may be provided as an assistance data from the mobile network.

The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile stations in vertical directions. For example, Z co-ordinate may be used when providing the location information in the vertical direction. The vertical location may be needed e.g. in mountainous environments or in cities with tall buildings.

Since there are various possibilities how to determine the location of the target user equipment and since the invention is not dependent on the used location determination technology, these are not be described in any greater detail herein.

The location service (LCS) functionality of the communication system is shown to be provided by several entities. A specific location service server entity 18 comprises components and bearers needed in provision of location services to LCS clients 24. The server entity may provide a platform which will enable the support of location based services in parallel with other telecommunication services such as speech, data, messaging, other teleservices, user applications and supplementary services. The LCS Server may thus provide the client 24, on request or periodically, the current or most recent geographic location (if available) of the target user equipment or, if the location fails, an error indication and optionally the reason for the failure.

FIG. 1 shows an entity 18 comprising a Gateway Mobile Location Center (GMLC) entity and a IP Servicing Mobile Location Center (SMLC) as an example of a location service entity for gathering and storing data that is required for the provision of the location information. The location information services entity 18 is arranged to receive via appropriate interface means information concerning the location of the mobile user equipment 10 from the cellular system 3. The location service entity 18 is typically implemented in the core network side of the communication system. The entity 18 may receive location information from the radio access network via appropriate controller entities such as the MSC (Mobile Switching Center) and/or HLR (Home Location Register) and/or a SMSC via appropriate interface means.

A specific gateway entity for accessing the location information services entity 18 may also be provided. In FIG. 1 the client application 24 is shown to request for user position from a location services middleware entity 22. The Location middleware entity 22 may be a mobile positioning enabling server that is responsible for functions such as user profiling (privacy checks), service screening, location data manipulation, charging, subscriber authentication, system control functions and so on.

The location middleware server entity 22 may be provided in the core network side of the communication system. The server may communicate with the client 24 by means of extended mark-up language (XML) documents based on the hypertext transfer protocol (http). As is also shown, the server entity 22 may then contact the entity 18 via an appropriate interface.

In FIG. 1 the location service (LCS) client 24 is shown to comprise an entity providing various service applications 25. The clients is entitled to receive at least some degree of information concerning the location (or location history) of a target user equipment. The client 24 may request for location information from the communication system. The client 24 can thus be seen as a logical functional entity that may make a request for location information of one or more target user equipment for what ever purposes.

The client 24 can consist of any entity that may make use of the location information and may provide location sensitive services. The service application may use the location information e.g. to enhance usability of the service or for content segmentation. Examples of such include, without any intention of being restricted to these, service applications such as pure location information services, games wherein location information can be utilised and fleet management applications.

The particular requirements and characteristics of a LCS Client are typically known to the location service server of the communication system e.g. based on a LCS client subscription profile. Particular restrictions associated with individual target user equipment may also be defined.

The LCS client 24 may be an entity that is external to the communication network. The LCS client may also be an internal client (ILCS) i.e. reside in any entity or node (including the mobile station) within the communication system. The communication between the LCS client 24 and the mobile user equipment 10 may occur via a Gateway GPRS Support Node (GGSN) 14 and Wireless Application Part (WAP) or short message services center (SMSC) node 16. The communication may occur on the user plane in accordance with e.g. the hypertext transport protocol (http).

The inventors have found that it is possible to use a user plane connection also for transportation of data messages that associate with the provision of information about the location of the target user equipment 10. For example, packet switched internet protocol (IP) user plane connection may be provided for such communication in parallel with another user plane communication media such as PDP (packet data protocol) context, data call, WLAN (Wireless Local Area Network) communications and so on. Messages that relate to the provisioning of the location information services such as the location information requests, responses and assistance data may be delivered via a IP connection that is set up for such messages e.g. in response to a location request.

FIG. 1 thus also illustrates a possible system architecture to implement user plane based positioning i.e. location information provision system. Communication of "normal" or actual telecommunication traffic such as voice, data or multimedia content to and/or from the user equipment 10 is carried as user plane communication. Signalling of messages that support the normal communication are carried on a control plane. However, communication of information supporting the provision of information about the location of the user equipment 10 is arranged to be carried on the user plane between at least a part of the entities involved in the provision of the location information. That is, user plane connections can be used instead of the control plane for the transfer of location information service specific data.

User plane can be used for communication of data between the user equipment 10 and the IP SMLC 20. It may also be used for communication of data between the user equipment 10 and the GMLC 19 or any other server or service that provides the interface between the client and/or appropriate functionality.

Different transmission control protocol (TCP) connections of a single IP session may be used in the provisioning of the location information services. Alternatively a dedicated IP session can be created for the location services, for example, between the serving mobile location center (IP SMLC) 20 and the user equipment 10.

The embodiments described in more detail with reference to FIGS. 2 and 3 enable use of an existing user plane IP session for communication of information that associated with the provisioning of the location information service. As shown by the flow chart of FIG. 4, if no user plane session exits, a new user plane IP session may be established for communication of the information associated with the provisioning of the location information. The new session may be established, for example, by means of the so called push WAP procedure or any other procedure available for the user plane connection establishment.

In operation, the client application 24 may make a request for location information to the location middleware entity 22. The client 24 may provide an identifier such as a nickname or the MSISDN (Mobile Subscriber Integrated Services Digital Network) number of the target user equipment as a part of the location request. The following describes a possibility to map the identifier in the request with an IP-address in the location service delivery chain such that the client 24 is not necessarily required to provide the actual IP address of the target user equipment in the request.

The IP address of the target user equipment is required so that assistance data can be transmitted over the user plane in a IP based positioning system. To facilitate this, the location middleware 22 is provided with a mechanism to enquire the IP address from an appropriate source. In FIGS. 1 to 3 the storage means for maintaining the association is provided by a storage means 34.

The storage means 34 maintains a database wherein the MSISDN identifier of a mobile user equipment and the IP address (or a plurality of IP addresses) assigned to said mobile user equipment are dynamically associated to each other. If no active PDP (packet data protocol) context can be found from the database, it can be concluded that there is no IP address for the target user equipment. In such a case a new user plane connection may be opened in order to generate an IP address for use by the location information service entities.

Figure 2:
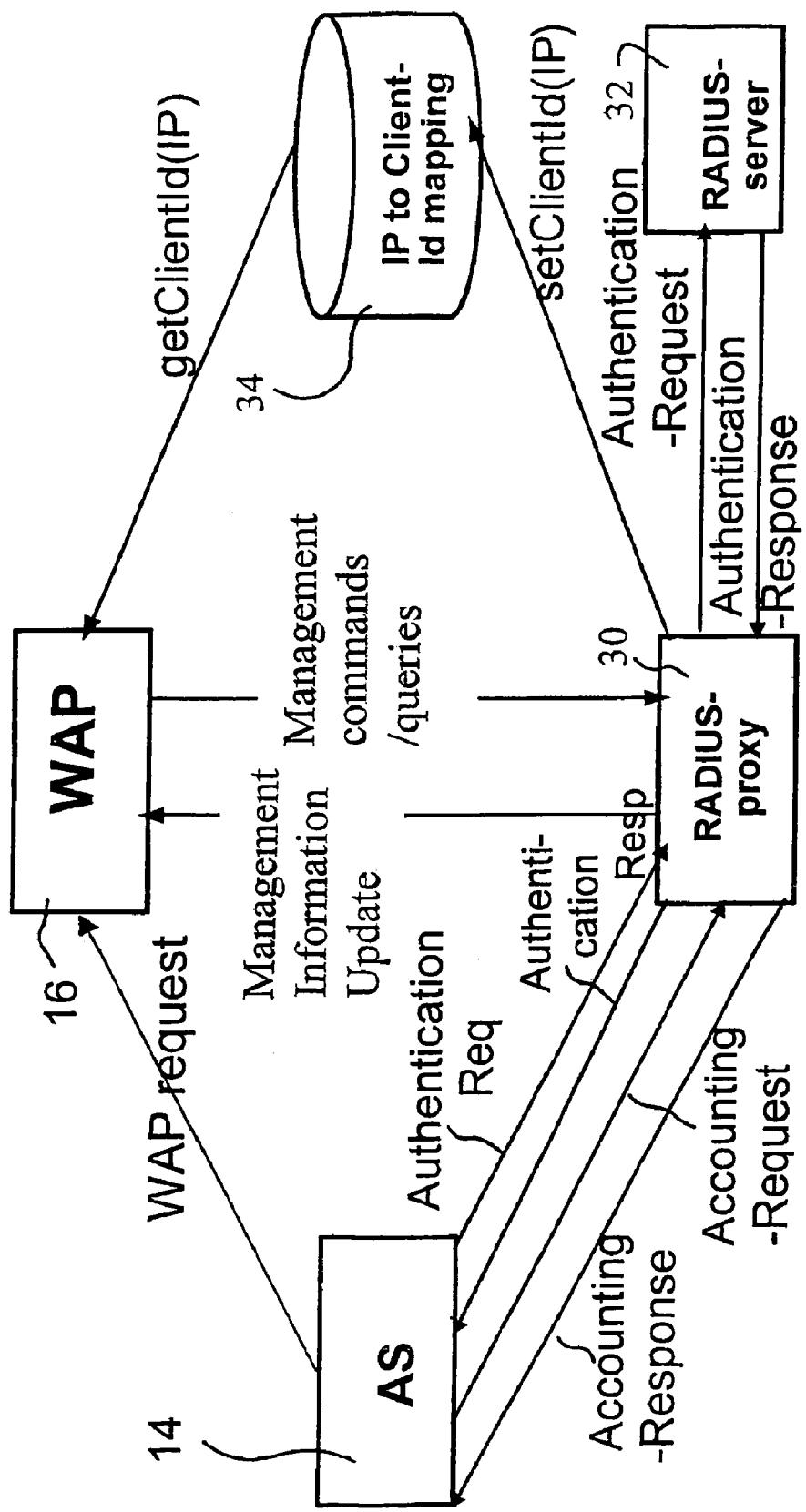
FIG. 2 shows mapping of IP addresses to identities 10 by means of a Radius server.
Figure 3:
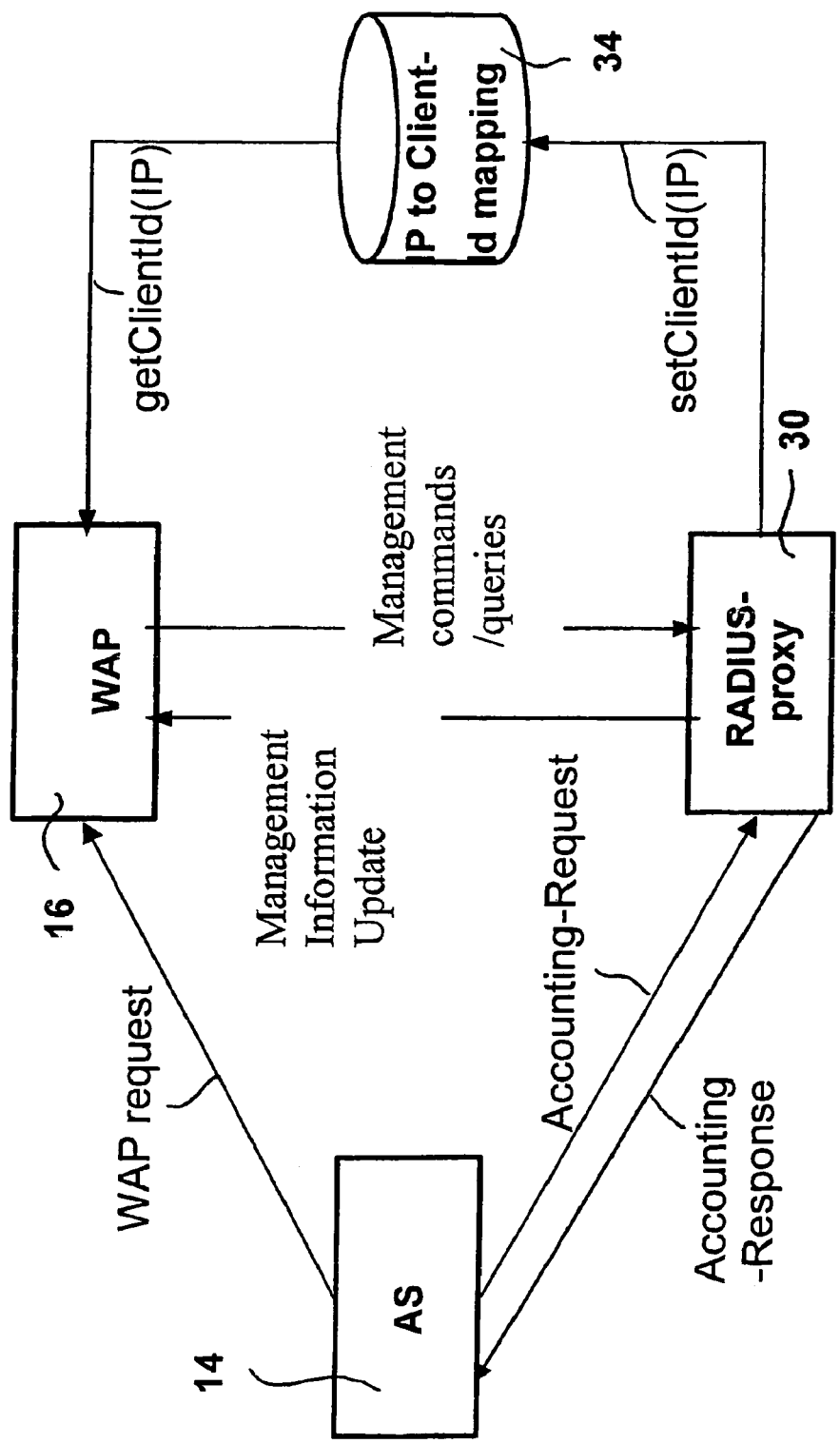
FIG. 3 shows another way of mapping IP addresses to identities.

FIGS. 2 and 3 show two embodiments. FIG. 2 arrangement corresponds to the RADIUS process of FIG. 1. The RADIUS process may be based on an open standard. However, the embodiments require a specific implementation of the RADIUS proxy 30 and the database storage client 34. The Radius proxy 30 can be provided by means of shareware.

During the PDP Context Activation, a GGSN (GPRS Gateway Support Node) 14 may provide subscriber authentication procedure to the Remote Authentication Dial-In User Service (RADIUS) server 32. This type of operation is defined e.g. in the Access Point name (APN) configuration of the GGSN. The authentication server resides preferably in the external Internet Service provider (ISP) or Internet network to which the user equipment 10 is connected.

The RADIUS server 32 and authentication processes are omitted from FIG. 3. By means of this it is possible to avoid some of the signalling stages of FIG. 2.

The IP serving mobile location center (IP SMLC) 20 may use an existing IP connection on the user plane to communicate with the user equipment 10 for obtaining information required for the location calculations. The user plane connection which may be used to convey location related requests, responses and assistance data may be accessed via the gateway GPRS support node (GGSN) 14, mobile portal or similar gateway to the user plane. That is, the GGSN 14 may provide a path or gateway to access a preestablished IP connection on the user plane, i.e. the access point or access server (AS). In practice this enables the IP SMLC 20 to communicate with the user equipment 10 via the GGSN 14. In accordance with an alternative a mobile portal provides the access point 14 instead of the GGSN.

As shown by FIGS. 1 to 3 the access server (AS; e.g. a GGSN) 14 may send a accounting request message including the so called Accounting-Request packets. The access server 14 may obtain various information from the Accounting-Request packets. The message may include, for example, data fields such as the IPADDRESS, MSISDN, IMSI (International Mobile Subscriber Identity), CHARGING-ID, PREPAID-IND, GGSN-IP-ADDRESS and SGSN-IP-ADDRESS of the target user equipment or subscriber. This information may be passed on to the storage means 34 for storage of these parameters.

The storage means 34 may provide appropriate mapping of the identifiers and IP addresses to provide the associations. In a possible implementation the mapping function may be provided by means of a separate mediator function. This may be provided in the middleware server 22 or in another application level network server. Such a server may be provided in association with the IP SMLC 20.

The mediator entity 20 may also include IP connection management function arranged to initiate the mapping of identifiers from the clients to IP addresses of the target mobile user equipment 10. When receiving a location information request the mediator with IP mapping capability may use the identifier (ID) of the requested subscriber and access the database 34 in order to obtain an IP address for the target user equipment. The IP address is then used for provision of communication connection to the user equipment 10, for example for sending of assistance data for location calculations.

Figure 4:
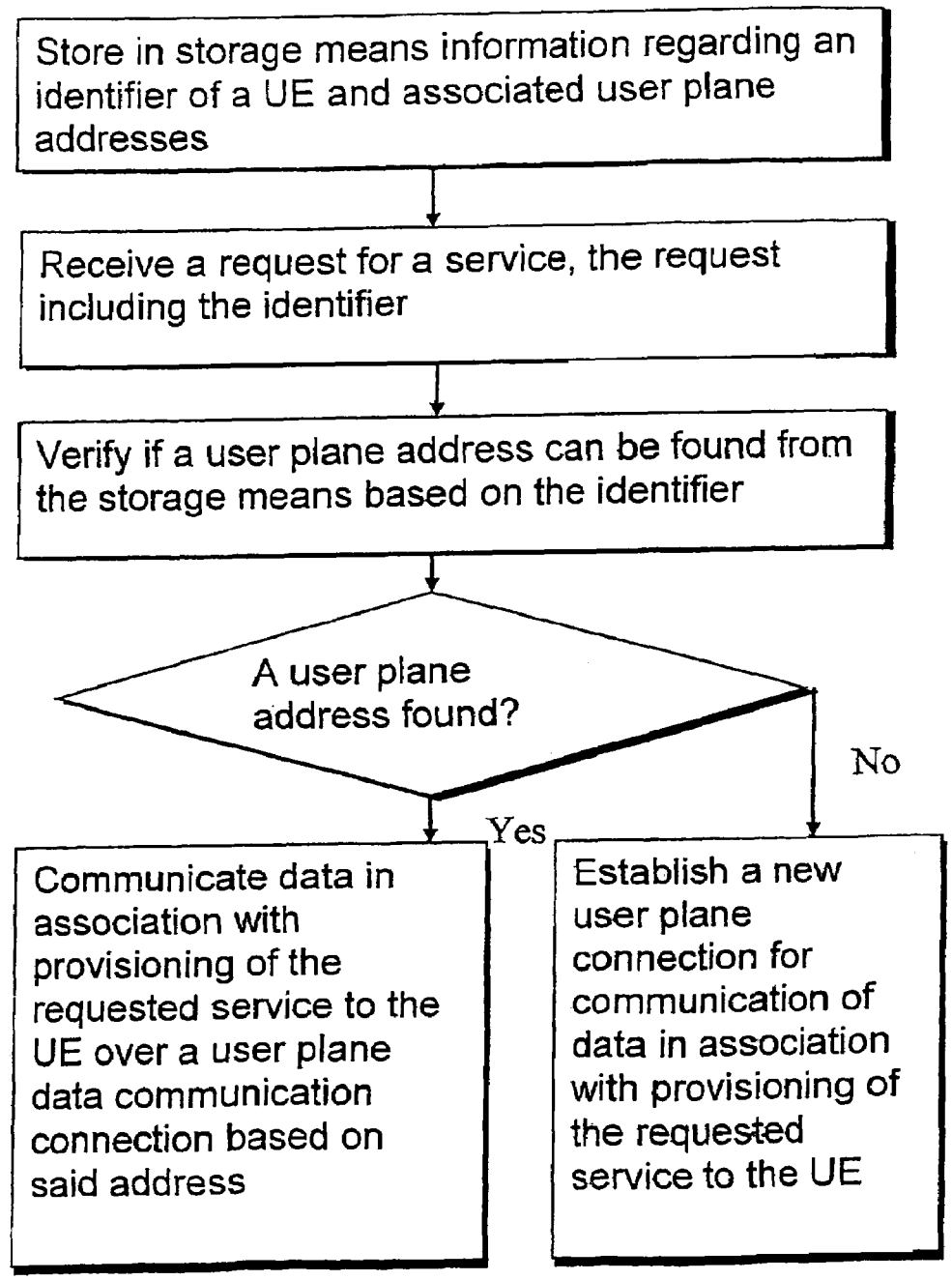
FIG. 4 is a flowchart illustrating the operation of one embodiment of the present invention.

As shown by FIG. 4, no IP address may be found. If no IP address exists it can be concluded that there is no active i.e. open PDP context to the user equipment 10.

If the IP address of the user equipment is known the location information is passed directly to IP Serving Mobile Location Server (SMLC) 20 for use in the location provision procedures.

The mediator may provide functions such as dynamic selection and gateway functions. More particularly, the mediator may select if location information is to be provided by the telecommunication system or by another location information provision system. The mediator entity may include a selection logic e.g. whether location is fetched from a gateway mobile location center (GMLC) 19 of the communication network or from another entity via an IP connection. The method to be used in the provisioning of the location information may be selected based e.g. on the Quality of positioning (QoP) parameter included in the request or based on any other appropriate criteria. The determination may be made based on any appropriate method, such as by utilising information regarding the service area identity/visited MSC (SAI/V-MSC) by means of the GMLC 19 or based on the GPS information that is accessible by the IP SMLC 20.

The mediator may know whether the user equipment 10 is attached to Home or roaming network. If the user equipment is in the home network the mediator sends a PDP context activation request to the user equipment 10. Destination address may be selected from a generic address pool. After the user equipment has activated a PDP context (and IP addresses are allocated) to the mediator, the location request is handed to the SMLC together with the IP address of the user equipment. If the user equipment is in roaming network a similar procedure can be used otherwise than that the IP address needs to be obtained separately.

The IP address mapping entity for retrieving IP addresses may be implemented at the IP SMLC 20 or as a part of the mediator, or in any other appropriate entity of the network. The mapping function may also be a shared functionality.

If the IP mapping functionality is provided as a separate function, it can be provided also for the roaming subscribers. The visited network can request the IP address from a location middleware counterpart of other network. The basic concept in here is that instead of asking IP mapping from the home network this may be asked from the visited network via a GMLC to GMLC interface or some other interface that may be provided between the entities.

An embodiment provides anonymity for the target user equipment. A database that includes MSISDN and IP address may also or alternatively include an identity such as a name (either the proper name or nickname of the target user) or authentication keys. The name or similar identity indicators may be passed to the location information services client as an identifier. The client may then use the identifier in the location request instead of MSISDN. In this case the location middleware would request for the IP address by sending the identifier to the database.

It shall be appreciated that although the above describes the invention in with reference to IP session, this is not the only possibility for the user plane communication. The communication may occur, for example, based on signalling via Abis/Iub interface, PDP context, short message service (SMS), data call and so on.

The IP session based positioning may be provided automatic PDP activation and IP address mapping. Both the access and location servers may be controlled by the operators, and thus it is possible to avoid the IP address information from entering outside the network.

It should be appreciated that whilst embodiments of the present invention have been described in relation to mobile stations, embodiments of the present invention are applicable to any other suitable type of mobile user equipment.

It should also be appreciated that whilst embodiments of the resent invention have been described in relation to location services, embodiments of the present invention are applicable to provision of any other services wherein at least a part of the data is transported on the user plane and wherein the client does not known the user plane address of the target user equipment.

Examples of the other services include the so called push type advertisement services. In this example the user may have defined to an application residing e.g. in the Internet/intranet that he allows pushing of advertisements to his/hers user equipment. Advertisements are sent e.g. every hour to the user equipment. The IP address for sending the advertisement is obtained as described above.

It is also noted herein that while the above describes exemplifying embodiments of the invention, there are several variations and modifications which may be made to the disclosed solution without departing from the scope of the present invention as defined in the appended claims.

The invention claimed is:

1. A method of communicating information, the method comprising:
   storing in a storage module, information about possible associations between an identifier of a mobile user equipment and user plane addresses;
   receiving at a service provisioning entity a request for the service from a client connected to a communication system, said request including the identifier of the mobile user equipment;
   verifying if a user plane address can be found from the storage module based on the identifier; and
   if such a user plane address is found from the storage module, communicating data associated with provisioning of the requested service to the mobile user equipment over an active user plane connection associated with said address found from the storage module; and
   if no user plane address can be found from the storage module based on the identifier, establishing a new user plane connection and communicating data associated with a provisioning of the requested service to the mobile user equipment over said established user plane connection, and
   thereby providing the provisioning of the service in the communication system.

2. A method as claimed in claim 1, wherein the requested service comprises a location information service and said data communicated on the user plane associates with provisioning of information regarding the geographical location of the mobile user equipment.

3. A method as claimed in claim 2, wherein said data communicated on the user plane comprises assistance data for use in location determinations by the mobile user equipment.

4. A method as claimed in claim 3, wherein said data communicated on the user plane comprises global positioning system (GPS) assistance data.

5. A method as claimed in claim 1, wherein the user plane communication occurs by means of an internet protocol (IP) session and the user plane address comprises an internet protocol (IP) address for the mobile user equipment.

6. A method as claimed in claim 1, wherein the identifier comprises a mobile subscriber integrated services digital network (MSISDN) number of the mobile user equipment.

7. A method as claimed in claim 1, wherein the identifier comprises a name that associates with the mobile user equipment.

8. A method as claimed in claim 1, comprising authentication of the client.

9. A method as claimed in claim 8, wherein the authentication is accomplished by means of a remote authentication dial-in user service (RADIUS) server.

10. A method as claimed in claim 1, wherein user plane address is fetched from the storage means by an access server.

11. A method as claimed in claim 10, wherein the access server comprises a gateway server entity.

12. An arrangement in a communication system, the arrangement comprising:
   a service provisioning entity is configured to receive a service request from the client, the request identifying a mobile user equipment by means of an identifier;
   storage module is configured to maintain information regarding possible associations between the identifier of the mobile user equipment and user plane addresses that can be used for user plane data transmissions in said communication system, wherein the storage module is arranged to verify if a user plane address for communication of data can be found from the storage module based on the identifier, and,
   if such a user plane address is found from the storage module, data associated with provisioning of the requested service to the mobile user equipment is communicated over an active user plane connection associated with said address found from the storage module, and if no user plane address can be found from the storage module based on the identifier, a new user plane connection is established and data associated with provisioning of the requested service to the mobile user equipment is communicated over said established user plane connection, thereby providing provision of a service in response to a request from the client, the provisioning of the service requiring communication of data to and/or from the mobile user equipment.

13. An arrangement as claimed in claim 12, wherein the requested service comprises a location information service and said data to be communicated on the user plane associates with provisioning of information regarding the geographical location of the mobile user equipment.

14. An arrangement as claimed in claim 13, wherein said data to be communicated on the user plane comprises assistance data for use in location determinations by the mobile user equipment.

15. An arrangement as claimed in claim 14, wherein said data to be communicated on the user plane comprises global positioning system (GPS) assistance data.

16. An arrangement as claimed in claim 12, wherein the user plane communication is arranged to be provided by an internet protocol (IP) session and the user plane address comprises an internet protocol (IP) address for the mobile user equipment.

17. An arrangement as claimed in claim 12, wherein the identifier comprises a mobile subscriber integrated services digital network (MSISDN) number of the mobile user equipment.

18. An arrangement as claimed in claim 12, wherein the identifier comprises a name that associates with the mobile user equipment.

19. An apparatus in a communication system, the apparatus comprising:

a service provisioning means for receiving a service request from the client, the request identifying a mobile user equipment by means of an identifier;

storage means for maintaining information regarding possible associations between the identifier of the mobile user equipment and user plane addresses that can be used for user plane data transmissions in said communication system, wherein the storage means is configured to verify if a user plane address for communication of data can be found from the storage means based on the identifier, and, if such a user plane address is found from the storage means, data associated with provisioning of the requested service to the mobile user equipment is communicated over an active user plane connection associated with said address found from the storage means, and if no user plane address can be found from the storage means based on the identifier, a new user plane connection is established and data associated with provisioning of the requested service to the mobile user equipment is communicated over said established user plane connection, thereby providing provision of a service in response to a request from the client, the provisioning of the service requiring communication of data to and/or from the mobile user equipment.

20. An apparatus in a communication system, the apparatus comprising:

a service provisioning unit configured to receive a service request from the client, wherein the request identifies a mobile user equipment by an identifier;

storage unit configured to maintain information regarding possible associations between the identifier of the mobile user equipment and user plane addresses that can be used for user plane data transmissions in said communication system, wherein the storage unit is configured to verify if a user plane address for communication of data can be found from the storage unit based on the identifier, and, if such a user plane address is found from the storage unit, data associated with provisioning of the requested service to the mobile user equipment is communicated over an active user plane connection associated with said address found from the storage means, and if no user plane address can be found from the storage unit based on the identifier, a new user plane connection is established and data associated with provisioning of the requested service to the mobile user equipment is communicated over said established user plane connection, thereby provision of a service is provided in response to a request from the client, wherein the provision of the service requires communication of data to and/or from the mobile user equipment.

\* \* \* \* \*